(12) United States Patent
Zamberger et al.

(10) Patent No.: US 11,536,341 B2
(45) Date of Patent: Dec. 27, 2022

(54) SPRING LEAF FOR A LEAF SPRING

(71) Applicant: Hendrickson Commercial Vehicle Systems Europe GmbH, Judenburg (AT)

(72) Inventors: Joerg Zamberger, Fohnsdorf (AT); Friedhelm Nattland, Kaarst (DE)

(73) Assignee: Hendrickson Commercial Vehicle Systems Europe GmbH, Judenburg (AT)

( * ) Notice: Subject to any disclaimer, the term of this patent is extended or adjusted under 35 U.S.C. 154(b) by 383 days.

(21) Appl. No.: 16/618,777

(22) PCT Filed: May 16, 2018

(86) PCT No.: PCT/EP2018/062701
§ 371 (c)(1),
(2) Date: Dec. 2, 2019

(87) PCT Pub. No.: WO2018/233944
PCT Pub. Date: Dec. 27, 2018

(65) Prior Publication Data
US 2020/0096071 A1 Mar. 26, 2020

(30) Foreign Application Priority Data
Jun. 23, 2017 (AT) ............... A 50522/2017

(51) Int. Cl.
*F16F 1/18* (2006.01)
*B60G 11/02* (2006.01)

(52) U.S. Cl.
CPC ............. *F16F 1/185* (2013.01); *B60G 11/02* (2013.01); *B60G 2202/11* (2013.01); *B60G 2206/428* (2013.01)

(58) Field of Classification Search
CPC .... F16F 1/185; F16F 1/368; F16F 2224/0241; B29C 53/564; B60G 2202/11; B60G 11/02; B60G 2206/428; B60G 2206/8109
(Continued)

(56) References Cited

U.S. PATENT DOCUMENTS 4,575,057 A * 3/1986 Robertson ............... F16F 1/185
267/47
4,749,534 A * 6/1988 Robertson ............... F16F 1/368
264/157

(Continued)

FOREIGN PATENT DOCUMENTS

DE          10260062 A1    7/2003
DE    102010041408 A1    3/2012
(Continued)

OTHER PUBLICATIONS

First Office Action issued by the China National Intellectual Property Administration for Application No. 2018880039915, dated Mar. 31, 2021 (10 pages) [Translation Only].
Search Report Issued by the Austrian Patent Office for Application No. A 50522/2017, dated Feb. 19, 2018 with English Translation (5 pages).
International Search Report and Written Opinion for International Application No. PCT/EP2018/06270, dated Aug. 13, 2018 with English Translation (18 pages).

*Primary Examiner* — Robert A. Siconolfi
*Assistant Examiner* — San M Aung
(74) *Attorney, Agent, or Firm* — Cook Alex Ltd.

(57) ABSTRACT

A spring leaf for a leaf spring (1) has an upper side (13), a lower side (14), two lateral sections extending between the upper side (13) and the lower side (14), a longitudinal axis (15), a section plane (III) extending perpendicularly to the upper side (13) and lower side (14) and through the longitudinal axis (15), two end sections (3a, 3b), and a middle
(Continued)

section (4) extending between the end sections (3*a*, 3*b*). The middle section (4) has a clamping region (5). A main tension region (6*a*, 6*b*) is provided between at least one of the end sections (3*a*, 3*b*) and the clamping region (5), the thickness (S) of which decreases in the direction from the clamping region (5) to the end section (3*a*, 3*b*), in particular decreases parabolically. The width (B) of the main tension region (6*a*, 6*b*) extending between the section plane (III) and a lateral section of the spring leaf (2) increases over a part of its length or over its entire length in the direction from the end section (3*a*, 3*b*) toward the clamping region (5) according to a quadratic function.

15 Claims, 2 Drawing Sheets

(58) Field of Classification Search
USPC .......................................................... 267/158
See application file for complete search history.

(56) References Cited

U.S. PATENT DOCUMENTS

| | | | |
|---|---|---|---|
| 2005/0051933 A1* | 3/2005 | Platner | B60G 11/465 267/38 |
| 2006/0103103 A1* | 5/2006 | Land | B60G 7/02 267/260 |

FOREIGN PATENT DOCUMENTS

| | | |
|---|---|---|
| EP | 1138432 A2 | 10/2001 |
| EP | 1980425 A1 | 10/2008 |
| EP | 2660083 A2 | 11/2013 |
| JP | S5837332 A | 3/1983 |
| JP | H01182105 | 7/1989 |
| WO | 0153779 A1 | 7/2001 |
| WO | 2014109943 A1 | 7/2014 |

\* cited by examiner

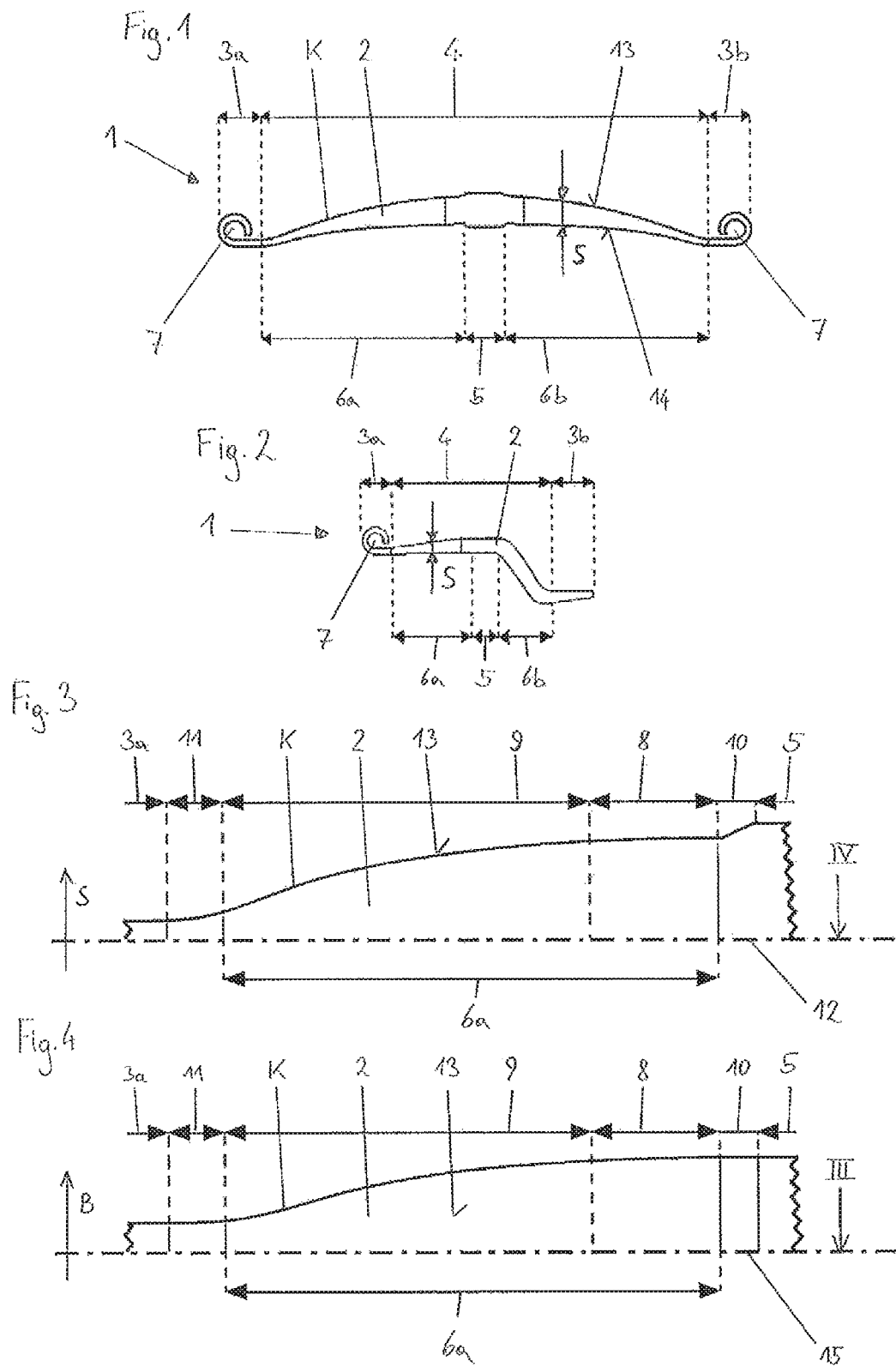

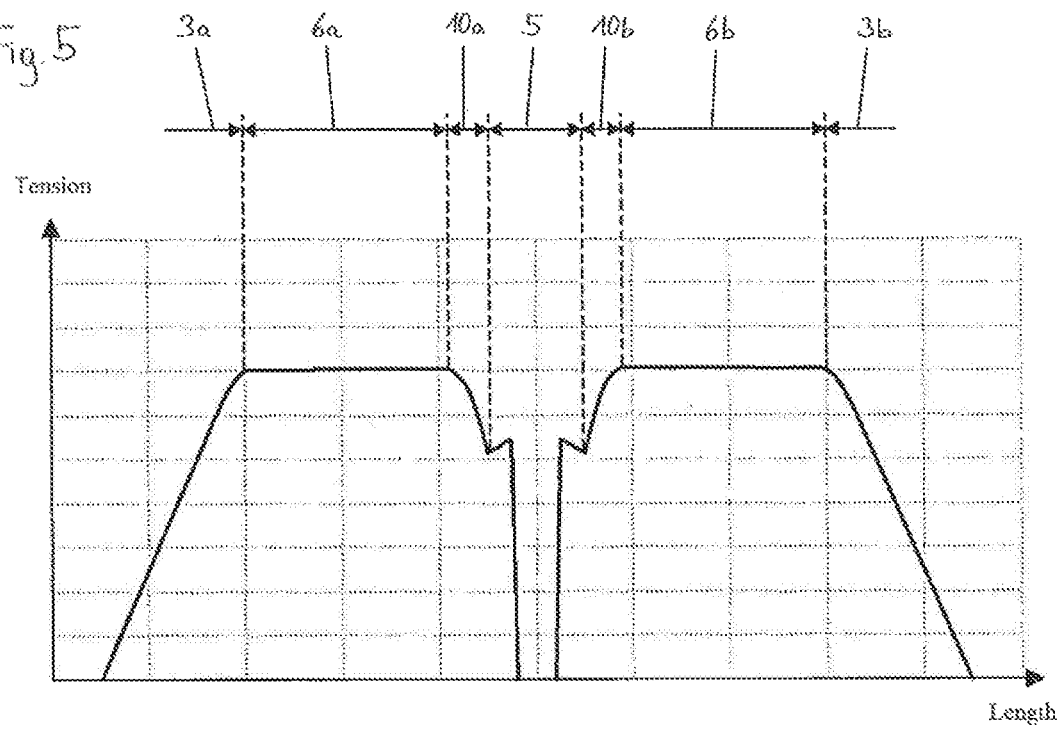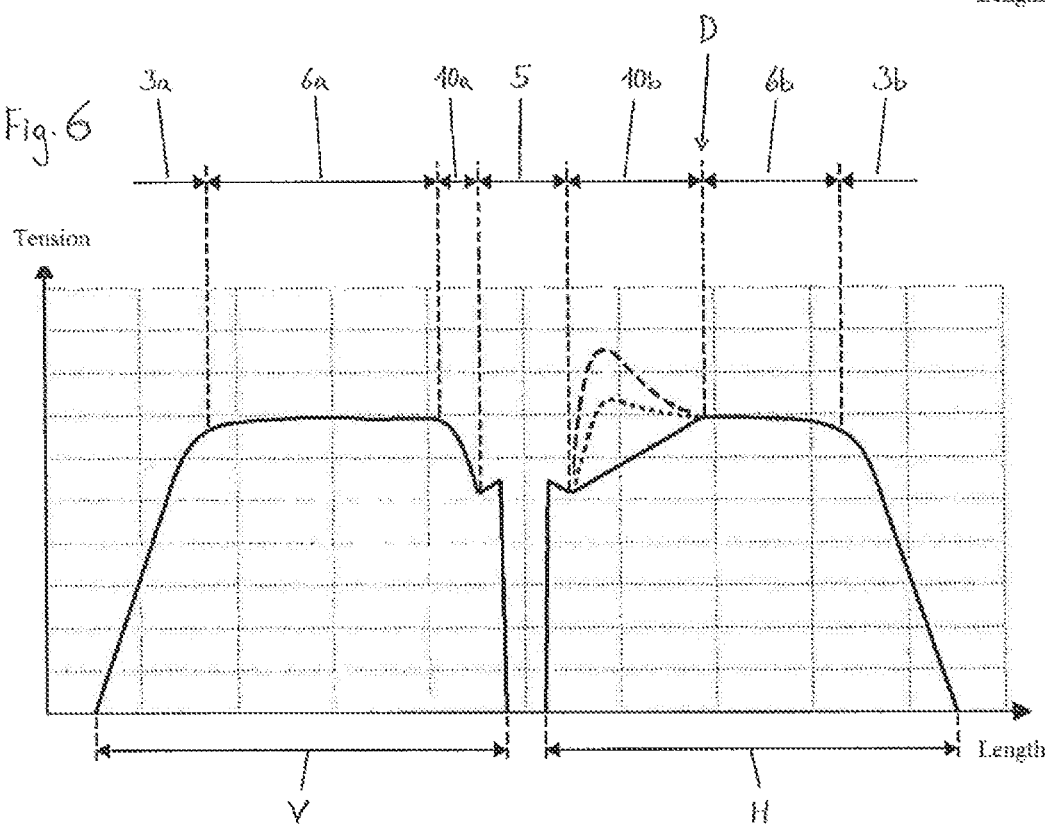

SPRING LEAF FOR A LEAF SPRING

CROSS-REFERENCE TO RELATED APPLICATIONS

The present application is a U.S. national stage application of International Patent Application No. PCT/EP2018/062701, filed May 16, 2018, which claims the benefit of Austrian Patent Application No. A 50522/2017, filed Jun. 23, 2017, both of which are incorporated by reference herein in their entireties.

The invention relates to a spring leaf for a leaf spring, wherein the spring leaf has an upper side, a lower side, two lateral sections extending between the upper side and the lower side, a longitudinal axis, a section plane extending perpendicularly to the upper side and lower side and through the longitudinal axis, two end sections, and a middle section extending between the end sections, wherein the middle section has a clamping region and wherein a main tension region is provided between at least one of the end sections and the clamping region, the thickness of which decreases, in particular decreases parabolically, in the direction from the clamping region to the end section.

Moreover, the invention relates to a leaf spring for a wheel suspension.

Such spring leaves or leaf springs are used in particular for utility vehicles, such as trucks. In this field of use, there is a special need for the leaf springs to have an essentially constant tension distribution in the loaded state in the main tension region. To achieve an essentially constant tension distribution in the main tension region, it is known that the spring leaves have an essentially constant width in this region, which corresponds to the width of the spring leaf in the clamping region, wherein the thickness decreases parabolically from the clamping region up to the end section. The parabolic decrease of the thickness of the main tensioning section toward the end section has established itself as essential for a constant tension distribution.

However, it is disadvantageous in this case that a constant width which corresponds to the width of the spring leaf in the clamping region has the result that the leaf spring has a relatively high weight. The saving of weight also represents a special need from a practical aspect.

In the production of leaf springs, the weight of the finished product plays a decisive economic role. One advantage of the use of the lightest possible leaf springs in vehicle construction is the weight reduction of the overall motor vehicle, which has the result that more transported goods can be loaded while maintaining the permissible maximum weight. However, trucks are often not loaded with the maximum possible transport weight or the trucks also sometimes travel unloaded, wherein the advantage of the lightest possible leaf spring is that the fuel consumption can be reduced. If the unsprung masses are reduced in a vehicle, one advantage is additionally that the driving safety is increased. However, the greatest advantage is the savings of the material usage during the production process and the accompanying cost reduction of the finished product.

To save material and therefore also weight, reducing the width of the main tension region of a spring leaf of a leaf spring from the clamping region to the end section is known. A material savings is possible by way of this design measure, without substantially reducing the strength and usability of the leaf spring, however. In addition, the requirement can exist that installation space is to be provided in the region of the wheel suspension, to be able to arrange further elements, because of which a constructively specified width of the end section has to be implemented, for example, to avoid an undesired contact of the leaf spring with attachment parts of a wheel suspension or other vehicle parts.

However, the reduction of the width of the main tension region of a spring leaf of a leaf spring has the problem that this affects the tension distribution in the main tension region.

Various embodiments of a leaf spring are known from WO 2014/109943 A1, which firstly have a transition region and subsequently a region having parabolically decreasing thickness between a clamping region and an end section starting from the clamping region. In the transition region, the thickness decreases linearly starting from the clamping region, wherein the width—depending on the embodiment—also decreases linearly, remains equal, or increases linearly. In the region having parabolically decreasing thickness, the width decreases linearly toward the end section.

A leaf spring is known from EP 1 980 425 A1, in which the width of the main tension region decreases linearly with uniform thickness and, adjoining thereon, the thickness decreases parabolically with uniform width.

A leaf spring is known from EP 1 138 432 A2, in which the width and the thickness of the main tension region decrease and, adjoining thereon, the thickness decreases with uniform width.

It has been shown that the linear decrease of the width has a negative effect on the tension distribution, because then the tension increases strongly in the direction toward the end section. Negative effects also occur with constant width of the main tension region in the region of the decreasing thickness, if the width is reduced in relation to the width of the clamping region.

In addition, a leaf spring is known from EP 1 138 432 A2, in which the width of the main tension region decreases over the length of the main tension region with uniform thickness. This embodiment has a varying tension distribution due to the thickness profile, wherein the decrease of the width over the length of the main tensioning section negatively affects the torsional rigidity.

The invention is based on the object of providing a spring leaf for a leaf spring, using which material and therefore also weight can be saved, wherein with monoaxial, vertical load, an essentially constant tension distribution is ensured in the main tension region, in particular in the event of stronger load of the leaf spring. At the same time, additional installation space is to be provided and undesired contacts of the spring leaf with attachment parts of a wheel suspension or other vehicle parts are to be avoided.

This object is achieved according to the invention by a spring leaf which has the features of Claim 1.

Moreover, this object is achieved by a leaf spring which has the features of Claim 10.

Preferred and advantageous embodiments of the invention are the subject matter of the dependent claims.

It is provided according to the invention that the width of the main tension region extending between the section plane and a lateral section of the spring leaf increases over a part of its length or over its entire length in the direction from the end section to the clamping region according to a quadratic function, i.e., the width of the main tension region decreases accordingly from the clamping region to the end section. It has surprisingly been shown that the main tension region, in the event of decreasing thickness under monoaxial, vertical load of the spring leaf, has an essentially constant tension distribution, if the width of the main tension region decreases at least partially in this manner from the clamping region to the end section. The advantages relating to weight reduction and installation space can therefore be achieved, without the disadvantages relating to tension distribution occurring.

In particular, it can be provided that the width of the main tensioning section extending between the section plane and a lateral edge of the spring leaf extends according to a quadratic function.

A lateral edge is also understood in the scope of the invention as a rounded or beveled edge. The lateral edge is, in the scope of the invention, the region in which the upper/lower side of the spring leaf merges into a lateral section extending to the lower/upper side of the spring leaf.

In one particularly preferred embodiment, it is provided that a lateral section and/or a lateral edge of the spring leaf extends in the main tension region essentially corresponding to the shape of a parabola arm. The entire width of the main tension region preferably extends essentially in the form of a parabola. Such a profile, in particular in combination with a parabolically decreasing thickness of the main tension region, is particularly advantageous for a constant tension distribution.

Leaf springs are frequently connected at the ends thereof to a spring hanger. If the width of the spring leaf or the leaf spring is reduced, the width of the spring hanger can also be reduced, whereby the total weight of the vehicle on which spring hanger and leaf spring are arranged can be reduced further.

In the case of a leaf spring, a differentiation is made between various load states. The two most important load states are the monoaxial, vertical load, i.e., a load in the vertical direction which continuously acts on the leaf spring, and the load of the leaf spring during a braking procedure. The load of the leaf spring during cornering can be mentioned as a further load state.

In the scope of the invention, monoaxial, vertical load is understood as a load of the leaf spring outside a braking procedure. The invention relates to advantageous effects relating to the monoaxial, vertical load state.

Using a spring leaf according to the invention, a main tension region can have an essentially constant tension distribution over its entire length or over a part of its length in the event of monoaxial, vertical load. This can be explained in greater detail based on the example of a longitudinal leaf spring as a front spring:

Longitudinal leaf spring means that the longitudinal extension of the leaf spring extends essentially parallel to the longitudinal extension of the vehicle viewed in the travel direction. In the case of a front spring, the leaf spring is connected in the clamping region to the front axle of the vehicle. The region in front of the front axle is referred to as the front region and the region behind the front axle is referred to as the rear region. In the case of a front spring, the leaf spring deforms upon increasing load during a braking procedure such that it carries out a so-called S-stroke. In this case, the spring bends downward in the front region and bends upward in the rear region. To limit the deflection upward in the rear region, a damper is generally arranged there on the chassis. In this front spring, two main tension regions are where the spring bends downward in the front region and bends upward in the rear region.

The tension distribution in the main tension region is to be essentially constant in the event of monoaxial, vertical load. Represented graphically, the tension distribution for the region between the clamping region and the damper has a disadvantageous deflection upward during a braking procedure. To counteract this deflection, the main tension region between the clamping region and the region at which the spring leaf strikes against the damper in the event of deformation is thickened, i.e., the thickness of the spring leaf is increased in this region. Due to the thickening, the tension distribution in this region, represented graphically, extends below the constant level to be achieved in the event of monoaxial, vertical load of the leaf spring.

A front spring according to the invention has an essentially constant tension distribution in the entire main tension region in the front region in the event of monoaxial, vertical load. In the rear region, the front spring has an essentially constant tension distribution in the part of the main tension region, which is not thickened, in the event of monoaxial, vertical load.

Since in the case of a rear spring, in which the leaf spring is connected to the rear axle of a vehicle in the clamping region, the S-stroke does not occur during the braking procedure, no thickening has to be provided in the case of a rear spring. The main tension region or the main tension regions of the rear spring has or have, respectively, a constant tension distribution throughout in the event of monoaxial, vertical load.

The main tension region is viewed in the meaning of the invention as a region in which the spring leaf is stressed most strongly under load and elastically deforms most strongly.

The clamping region is viewed in the meaning of the invention as a region of the spring leaf which is usually arranged in the middle in the longitudinal direction of the leaf spring and preferably has a greater thickness than the sections of the spring leaf adjoining thereon. A leaf spring having a single one or multiple spring leaf/spring leaves according to the invention, which is installed in a vehicle, is connected in the clamping region via a connection device, in particular via one or multiple U-shaped bolts or molded parts enclosing the leaf spring in the clamping region, to a wheel axle or to a wheel stub axle.

A chassis is understood as a vehicle frame or a chassis of a vehicle, on which a wheel suspension is arranged.

If a leaf spring has multiple spring leaves, the spring leaves are preferably connected to one another at least in the clamping region, in particular via a bolt guided through a central passage hole in the clamping region of each spring leaf, wherein the spring leaves either press directly against one another or intermediate elements, for example, intermediate plates, are arranged or clamped between the spring leaves. In the scope of the invention, embodiments without a passage hole are also fundamentally possible, wherein the spring leaves are then connected to one another by formfitting elements, for example.

In the scope of the invention, it can be provided that the main tension region has a first subregion and a further subregion in the direction from the clamping region to the end section, wherein the thickness of the first subregion decreases with uniform width and the thickness of the further subregion decreases with decreasing width. It can also be provided that the width sectionally decreases linearly in the further subregion.

In one preferred embodiment of the spring leaf, a transition region is arranged between the main tension region and the clamping region and/or between the main tension region and the end section, wherein the thickness of the spring leaf decreases in the direction toward the end section, in particular non-linearly, preferably concavely, in the transition region from the clamping region to the main tension region and/or in the transition region from the main tension region to the end section. Such transition regions facilitate the manufacturing of the spring leaf and prevent the occurrence of abrupt or sharp transitions or tension transitions (tension jumps) between the clamping region, the main tension region, and the end section. It is preferable if, in the direction from the clamping region to the end section, after the main tension region, the width and/or the thickness of the transition region or end section adjoining thereon decreases or remains essentially constant. An embodiment in which the width and/or the thickness of the transition region or end section adjoining the main tension region increases is also conceivable in the scope of the invention, however. A spring leaf according to the invention can be adapted to various attachment dimensions by this design feature.

In the scope of the invention, the main tension region does not have to merge directly into an end section. Between the main tension region and the transition region to the end section, the spring leaf can also have a further region, which can fulfill various functions.

In one particularly preferred embodiment, the spring leaf has the form of a holding means in at least one end section or at least one end section is formed in the form of a holding means. The holding means is a means for connecting the spring leaf or the leaf spring to a chassis or to attachment parts of a wheel suspension of a vehicle, for example, a rolled spring eye.

In one advantageous embodiment, a main tension region, which has an essentially constant tension distribution in the event of loaded spring leaf, is arranged in the middle section on each of the two sides of the clamping region. The middle section of the spring leaf can be formed essentially identically on both sides of the clamping region. This also includes a variant, in the scope of the invention, in which the main tension region is thickened on one side of the clamping region, to compensate for the problems described with respect to the "S-stroke".

In the scope of the invention, a leaf spring for a wheel suspension is provided, which has at least one spring leaf according to the invention. The leaf spring can have one spring leaf or multiple spring leaves arranged one on top of another, wherein in the case of a multi-leaf leaf spring, the spring leaves can be formed identically and/or differently and multiple or all of the spring leaves can be spring leaves according to the invention.

An embodiment is particularly preferred in which the leaf spring is a parabolic spring, wherein in the middle section, a main tension region is only arranged on one side of the clamping region or a main tension region is arranged on each of the two sides of the clamping region. In a further preferred embodiment, the leaf spring is a suspension arm spring, wherein in the middle section, a main tension region is arranged on only one side of the clamping region, in particular between the clamping region and a holding means formed in the end section of the spring leaf.

Further details, features, and advantages of the invention result from the following description of preferred embodiments, which do not restrict the scope of protection, of the invention with reference to the appended drawings. In the figures:

FIG. 1 shows a side view of a first embodiment of a spring leaf according to the invention for a parabolic spring, FIG. 2 shows a side view of a further embodiment of a spring leaf according to the invention for a suspension arm spring, FIG. 3 shows a side view of a detail of a leaf spring according to the invention from the viewpoint on a plane III from FIG. 4, FIG. 4 shows a top view of a detail of a leaf spring according to the invention from the viewpoint on a plane IV from FIG. 3, FIG. 5 shows a tension distribution of a leaf spring according to the invention based on the example of a rear spring, and FIG. 6 shows a tension distribution of a leaf spring according to the invention based on the example of a front spring.

FIG. 1 shows a side view of a leaf spring 1, which is a parabolic spring having a spring leaf 2 in the illustrated embodiment. The leaf spring 2 has two end sections 3a, 3b and a middle section 4 arranged in between. The middle section 4 has a clamping region 5 in the middle, which has a greater thickness S than the sections of the spring leaf 2 adjoining thereon. The thickness S forms the distance between the spring leaf upper side 13 to the spring leaf lower side 14. The leaf spring 1 is connected to a wheel axle in the clamping region 5 in the installed state.

A main tension region 6a, 6b is provided in each case between the clamping region 5 and the end sections 3a, 3b. The main tension regions 6a, 6b are formed essentially identically, wherein the thickness S of the spring leaf 2 decreases in the main tension regions 6a, 6b from the clamping region 5 toward the respective associated end section 3a, 3b. In the event of monoaxial, vertical load of the leaf spring 2, each main tension region 6a, 6b has an essentially uniform tension distribution, since the thickness S and width B of the main tension regions 6a, 6b essentially decreases, as shown in FIG. 3, in the direction from the clamping region 5 toward the respective end section 3a, 3b.

The spring leaf 2 has a means 7 in each of the end sections 3a, 3b for connection of the spring leaf 2 to a chassis or to attachment points of a wheel suspension, wherein the means 7 is embodied as a rolled eye.

FIG. 2 shows a side view of a leaf spring 1, which is a suspension arm spring having a spring leaf 2 in the illustrated embodiment. The spring leaf 2 has two end sections 3a, 3b and a middle section 4 arranged in between. The middle section 4 has a clamping region 5 in the middle.

The spring leaf 2 has a means 7 in the end section 3a for connection of the spring leaf 2 to a chassis or to attachment parts of a wheel suspension, wherein the means 7 is embodied as a rolled eye. An air spring bellows can be arranged on the opposing end section 3b.

A main tension region 6a is only provided between the clamping region 5 and the end section 3a having the rolled eye, which has an essentially uniform tension distribution in the event of monoaxial, vertical load of the leaf spring 2, since the thickness S and width B of the main tension regions 6a, 6b, as shown in FIG. 3, essentially decreases in the direction from the clamping region 5 toward the respective end section 3a, 3b. A region bent over in the opposite direction is provided between the clamping region and the end section 3b provided for an air spring bellows.

FIGS. 3 and 4 show a detail of the spring leaf 2 according to the invention from FIG. 1 or FIG. 2. In FIG. 3, a part of the spring leaf 2 arranged above an imaginary partition line 12 is shown in a side view. FIG. 3 shows the profile of the thickness S. In FIG. 4, the spring leaf 2 is shown laterally from a longitudinal axis 15 of the spring leaf 2 in a top view. The longitudinal axis 15 can be an axis of symmetry. FIG. 4 shows the progression of the width B.

The detail shows a section of the clamping region 5, the main tension region 6a, which can have a first partial region 8 and a further partial region 9 adjoining thereon, and a section of the end section 3a. The progression of the spring leaf upper side 13 is essentially linear in the illustrated sections of the clamping region 5 and the end section 3a, wherein the thickness S remains essentially identical. The thickness S can also increase or decrease in other embodiments. In the main tension region 6a, the profile of the spring leaf upper side 13 is essentially parabolic, wherein the thickness S decreases in the direction toward the first end section 3a.

A first transition region 10 is arranged between the main tension region 6a and the clamping region 5 and a further transition region 11 is arranged between the main tension region 6a and the end section 3a. The transition regions 10 and 11 each form a transition between the linear and the parabolic profile of the spring leaf upper side 13, wherein the thickness S of the spring leaf 2 decreases linearly in the first transition region 10 and non-linearly in the further transition region 11.

The width B is constant in the clamping region 5, in the first transition region 10, in the further transition region 11, and in the end section 3a. In particular in the end section 3a, the width B can increase again, so that a spring eye which is possibly provided there can be adapted to dimensions of a wheel suspension specified by the design. The width B of the main tension region 6a extending between the longitudinal axis 15 and a lateral edge K of the spring leaf 2 extends according to a quadratic function. The lateral edge K extends substantially corresponding to the shape of a parabola arm, wherein the width B decreases in the direction toward the first end section 3a. The width B can be constant in the first subregion 8 of the main tension region 6a and can decrease corresponding to the shape of a parabola arm in the further subregion 9.

Further regions can be provided between the main tension region 6a and the end section 3a or between the main tension regions 6a, 6b in the corresponding end section 3a, 3b, the width B and/or thickness S of which can be constant or varying.

FIG. 5 shows the tension distribution of a leaf spring 1 according to FIG. 1 based on the example of a rear spring under monoaxial, vertical load, i.e., outside a braking procedure. It is apparent that the tension increases starting from the clamping region 5 into the first transition regions 10a, 10b. The tension distribution is constant in the main tension regions 6a, 6b. The tension decreases in the end regions 3a, 3b and in the further transition regions 11.

FIG. 6 is used to illustrate the tension distribution based on the example of a longitudinal leaf spring as the front spring having a thickened region. The front spring is connected to the front axle of a vehicle in the clamping region 5. The region in front of the front axle is referred to as the front region V and the region behind the front axle is referred to as the rear region H. In the event of increasing load during a braking procedure, the leaf spring 1 carries out a so-called S-stroke, wherein the spring bends downward in the front region V and bends upward in the rear region H. To limit the deflection upward in the rear region H, a damper D is generally arranged there on the chassis.

The tension distribution in the main tension region 6b has a deflection upward (dashed line) during a braking procedure for the region between the clamping region 5 and the damper D. To counteract this deflection, the main tension region 6b is thickened between the clamping region 5 and the region at which the spring leaf 2 strikes against the damper D in the event of deformation, so that the resulting impact is not as strong (dotted line). Due to this thickening, the tension distribution in the event of monoaxial, vertical load of the leaf spring 1, i.e., outside the braking procedure, extends below the constant level to be achieved (solid line). The spring leaves 2 according to the invention according to FIGS. 1, 2, and in particular 3 and the tension distribution in particular according to FIG. 5 are not necessarily shown to scale and/or correctly proportioned for better comprehension.

In summary, an exemplary embodiment of the invention can be described as follows:

A spring leaf for a leaf spring 1 has an upper side 13, a lower side 14, two lateral sections extending between the upper side 13 and the lower side 14, a longitudinal axis 15, a section plane III, which extends perpendicularly to the upper side 13 and lower side 14 and through the longitudinal axis 15, two end sections 3a, 3b, and a middle section 4 extending between the end sections 3a, 3b. The middle section 4 has a clamping region 5. A main tension region 6a, 6b is provided between at least one of the end sections 3a, 3b and the clamping region 5, the thickness S of which decreases in the direction from the clamping region 5 toward the end section 3a, 3b, in particular decreases parabolically. The width B of the main tension region 6a, 6b extending between the section plane III and a lateral section of the spring leaf 2 increases over a part of its length or over its entire length in the direction from the end section 3a, 3b to the clamping region 5 according to a quadratic function.

The invention claimed is:

1. A spring leaf for a leaf spring, wherein the spring leaf has an upper side, a lower side, two lateral sections extending between the upper side and the lower side, a longitudinal axis, a section plane (III) extending perpendicularly to the upper side and lower side and through the longitudinal axis, two end sections, and a middle section extending between the end sections, wherein the middle section has a clamping region and wherein a main tension region is provided between at least one of the end sections and the clamping region, the thickness (S) of which decreases parabolically in the direction from the clamping region to the end section wherein a first transition region is arranged between the main tension region and the clamping region, and the thickness (S) of the spring leaf decreases in the first transition region from the clamping region to the main tension region with uniform width, and wherein the main tension region has a first subregion and a further subregion in the direction from the clamping region toward the end region, and the thickness (S) of the first subregion decreases with uniform width (B) and the thickness (S) of the further subregion decreases with decreasing width and the width (B) of the further subregion main tension region extending between the section plane (III) and a lateral section of the spring leaf increases in the direction from the end section toward the clamping region according to a quadratic function.

2. The spring leaf according to claim 1 wherein the width (B) of the main tensioning section extending between the section plane (III) and a lateral edge (K) of the spring leaf extends according to a quadratic function.

3. The spring leaf according to claim 1 wherein a lateral section and/or a lateral edge (K) of the spring leaf in the main tension region extends essentially corresponding to the shape of a parabola arm.

4. The spring leaf according to claim 1 wherein the regions on both sides of the section plane (III) are symmetrical to one another.

5. The spring leaf according to claim 1 wherein the width (B) sectionally decreases linearly in the further subregion.

6. The spring leaf according to claim 1 wherein a further transition region is arranged between the main tension region and the end section, wherein the thickness (S) of the spring leaf decreases in the further transition region from the the main tension region to the end section.

7. The spring leaf according to claim 6 wherein the thickness (S) of the first transition region from the clamping region to the main tension region and/or the further transition region from the main tension region to the end section decreases nonlinearly.

8. The spring leaf according to claim 1 wherein after the main tension region, viewed in the direction from the clamping region to the end section, the width (B) and/or the thickness (S) of the further transition region or end section adjoining thereon decreases, remains essentially constant, or increases.

9. The spring leaf according to claim 1 wherein the spring leaf has a means in at least one end section for connecting the spring leaf to a chassis or to attachment parts of a wheel suspension.

10. The spring leaf according to claim 1 wherein a main tension region is arranged in the middle section on each of the two sides of the clamping region.

11. A leaf spring for a wheel suspension wherein the leaf spring has at least one spring leaf according to claim 1.

12. A leaf spring according to claim 11 wherein the leaf spring is a parabolic spring or a trailing suspension arm spring.

13. The spring leaf according to claim 7 wherein the thickness of the first transition region from the clamping region to the main tension region and/or the further transition region from the main tension region to the end section decreases concavely.

14. The spring leaf according to claim 9 wherein the means in the at least one end section for connecting the spring leaf comprises a rolled spring eye.

15. The spring leaf according to claim 10 wherein the middle section of the leaf spring is formed essentially symmetrically to the clamping region on both sides of the clamping region.

* * * * *